(12) United States Patent
Yotsuzuka

(10) Patent No.: US 9,328,748 B2
(45) Date of Patent: May 3, 2016

(54) HYDRAULIC EXCAVATOR

(71) Applicant: KOMATSU LTD., Tokyo (JP)

(72) Inventor: Hironori Yotsuzuka, Komatsu (JP)

(73) Assignee: KOMATSU LTD., Tokyo (JP)

( * ) Notice: Subject to any disclaimer, the term of this patent is extended or adjusted under 35 U.S.C. 154(b) by 48 days.

(21) Appl. No.: 14/358,738

(22) PCT Filed: Dec. 4, 2013

(86) PCT No.: PCT/JP2013/082538
§ 371 (c)(1),
(2) Date: May 16, 2014

(87) PCT Pub. No.: WO2014/181490
PCT Pub. Date: Nov. 13, 2014

(65) Prior Publication Data
US 2015/0275937 A1 Oct. 1, 2015

(51) Int. Cl.
| | |
|---|---|
| F16D 31/02 | (2006.01) |
| F15B 21/04 | (2006.01) |
| B60K 11/04 | (2006.01) |
| E02F 9/08 | (2006.01) |
| F01P 11/08 | (2006.01) |
| E02F 9/22 | (2006.01) |
| F01P 3/18 | (2006.01) |

(52) U.S. Cl.
CPC .............. *F15B 21/042* (2013.01); *B60K 11/04* (2013.01); *E02F 9/0866* (2013.01); *E02F 9/2278* (2013.01); *F01P 3/18* (2013.01); *F01P 11/08* (2013.01); *B60Y 2200/412* (2013.01)

(58) Field of Classification Search
CPC .............................. F15B 21/042; B60K 11/04
USPC ........................................................... 60/456
See application file for complete search history.

(56) References Cited

U.S. PATENT DOCUMENTS

| | | |
|---|---|---|
| 2002/0149232 A1 | 10/2002 | Sakyo et al. |
| 2005/0006157 A1 | 1/2005 | Shioji et al. |
| 2005/0173095 A1 | 8/2005 | Fujita et al. |
| 2008/0169142 A1 | 7/2008 | Kinoshita et al. |
| 2012/0067658 A1 | 3/2012 | Ueda |

FOREIGN PATENT DOCUMENTS

| | | |
|---|---|---|
| CN | 1388846 A | 1/2003 |
| CN | 1536176 A | 10/2004 |
| EP | 1867560 A1 | 12/2007 |
| JP | 2001-246943 A | 9/2001 |
| JP | 2002-161552 A | 6/2002 |
| JP | 2006-234194 A | 9/2006 |
| JP | 2009-120036 A | 6/2009 |
| JP | 2013-237981 A | 11/2013 |
| KR | 10-2002-0061603 A | 7/2002 |

*Primary Examiner* — Edward Look
*Assistant Examiner* — Daniel Collins
(74) *Attorney, Agent, or Firm* — Drinker Biddle & Reath LLP (57) ABSTRACT

A hydraulic excavator is provided which can allow the cooling device to be arranged in proximity to a rear wall of a cab. The rear wall of the cab has an upright wall part extending in the vertical direction and an inclined wall part inclined to the rear upper side with respect to the upright wall part. The outer surface of an oil cooler has a front surface facing the upright wall part and extending in the vertical direction and an inclined surface inclined to the rear upper side with respect to the front surface. The upper edge of the front surface is arranged below the height position of the other edge of the inclined wall part. An angle formed by the upright wall part and the inclined wall part is more than or equal to an angle formed by the front surface and the inclined surface.

19 Claims, 10 Drawing Sheets

HYDRAULIC EXCAVATOR

TECHNICAL FIELD

The present invention relates to a hydraulic excavator, and particularly to a hydraulic excavator having a cooling device.

BACKGROUND ART

Conventionally, a hydraulic excavator includes various kinds of cooling devices, such as a radiator which cools engine cooling water, an oil cooler which cools a hydraulic fluid supplied to a hydraulic actuator, and an intercooler which cools compressed air supplied to an engine. Japanese Patent Laying-Open No. 2001-246943 (PTD 1) discloses a configuration in which a lower part of a rear wall of a cab is formed into a shape retracted into the cab to provide space on the rear side of the rear wall, a radiator and an oil cooler have a rectangular shape when viewed in side view, and a baffle plate is provided between the lower part of the rear wall of the cab and the side surface of the radiator.

CITATION LIST

Patent Document

PTD 1: Japanese Patent Laying-Open No. 2001-246943

SUMMARY OF INVENTION

Technical Problem

In order to avoid contact with an obstacle located backward at the time of revolving, a hydraulic excavator is required to have a smaller engine compartment and reduced space between a cooling device arranged on the rear side of the rear wall of a cab and the rear wall. However, if the cooling device having a rectangular shape when viewed in side view disclosed in the above-described publication is moved forward so as to approach the rear wall of the cab, the cooling device will interfere with an inclination of the rear wall of the cab. To prevent interference with the rear wall of the cab, it is necessary to reduce the entire height of the cooling device. In this case, however, a core part of the cooling device will be decreased in area, resulting in degraded performance of the cooling device.

When the cooling device has a rectangular shape when viewed in side view and in the case where a sealing material is present between the rear wall of the cab and the outer surface of the cooling device, corner portions of the cooling device are brought into line contact with the sealing material to cause stress concentration, which damages the sealing material.

The present invention was made in view of the above-described problem and has an object to provide a hydraulic excavator that can maintain performance of a cooling device, allows the cooling device to be arranged in proximity to the rear wall of a cab, and further, can suppress damage to a sealing material.

Solution to Problem

A hydraulic excavator of the present invention includes a cab having a rear wall, and a cooling device arranged on a rear side of the rear wall. The rear wall has an upright wall part and an inclined wall part. The upright wall part extends in the vertical direction. The inclined wall part is connected to an upper edge of the upright wall part and is inclined to a rear upper side with respect to the upper edge of the upright wall part. An outer surface of the cooling device has a front surface and an inclined surface. The front surface faces the upright wall part and extends in the vertical direction. The inclined surface is connected to an upper edge of the front surface and is inclined to the rear upper side with respect to the upper edge of the front surface. The inclined wall part has one edge connected to the upright wall part and the other edge opposite to the one edge. The upper edge of the front surface is arranged below a height position of the other edge. The upright wall part and the inclined wall part form an angle more than or equal to an angle formed by the front surface and the inclined surface.

According to the hydraulic excavator of the present invention, interference between the rear wall of the cab and the cooling device can be suppressed. Accordingly, the cooling device can be arranged in proximity to the rear wall. Therefore, a hydraulic excavator can be achieved which allows the cooling device to be arranged in proximity to the rear wall of the cab while maintaining cooling performance of the cooling device. In the case where a sealing material is present between the rear wall of the cab and the outer surface of the cooling device, the sealing material can be brought into surface contact with the inclined surface. Therefore, stress concentration can be relieved, and damage to the sealing material can be suppressed.

In the above-described hydraulic excavator, the upper edge of the front surface is positioned between a bisector of the angle formed by the upright wall part and the inclined wall part and a height position of the upper edge of the upright wall part, in the vertical direction. Then, contact between the cooling device and the rear wall can be prevented, while ensuring space to be filled with the sealing material between the cooling device and the rear wall of the cab.

In the above-described hydraulic excavator, the inclined surface has a portion extending in parallel to the inclined wall part. Accordingly, the cooling device can be arranged in proximity to both the upright wall part and the inclined wall part of the rear wall. Therefore, the distance between the rear wall and the cooling device can be made smaller.

The above-described hydraulic excavator further includes a work implement and a hydraulic actuator driving the work implement. The cooling device is an oil cooler cooling a hydraulic fluid supplied to the hydraulic actuator. Accordingly, the oil cooler can be arranged in proximity to the rear wall of the cab, while suppressing interference between the rear wall of the cab and the oil cooler and maintaining cooling performance of a hydraulic fluid by the oil cooler.

In the above-described hydraulic excavator, the oil cooler includes a core part cooling the hydraulic fluid passing therethrough and an upper tank arranged over the core part. The front surface and the inclined surface constitute an outer surface of the upper tank. A cross section of the upper tank perpendicular to a front-back direction has a rectangular outer shape. Then, since the outer surface of the upper tank is provided with the inclined surface, the shape of the core part can be kept, and the dimensions of the core part can be maintained without the need to decrease the dimension in the height direction of the core part for preventing interference between the oil cooler and the rear wall. Therefore, cooling performance of a hydraulic fluid in the core part can be ensured. When the upper tank is formed into a shape having a rectangular cross section, it will be easier to ensure the capacity of the upper tank even if the upper tank is provided with an inclined surface.

The above-described hydraulic excavator further includes a second cooling device arranged on the rear side of the cooling device. The uppermost surface of the second cooling device is arranged at a position higher than the uppermost surface of the cooling device. Then, the dimension in the height direction of the second cooling device can be increased as compared with the cooling device so as to conform to the inclination of the inclined wall part of the rear wall. Accordingly, the second cooling device can be increased in cooling capacity.

The above-described hydraulic excavator further includes a sealing material provided between the rear wall and the outer surface of the cooling device. Because the outer surface of the cooling device has an inclined surface, the sealing material can be brought into surface contact with the inclined surface. Accordingly, stress concentration can be relieved, and damage to the sealing material can be suppressed.

Advantageous Effects of Invention

According to the present invention as described above, a hydraulic excavator can be achieved which can maintain performance of a cooling device, allows the cooling device to be arranged in proximity to a rear wall of a cab, and further, can suppress damage to a sealing material.

DESCRIPTION OF EMBODIMENTS

Hereinafter, embodiments of the present invention will be described with reference to the drawings.

First Embodiment

Firstly, a configuration of a hydraulic excavator to which the idea of the present invention is applicable will be described.

Figure 1:
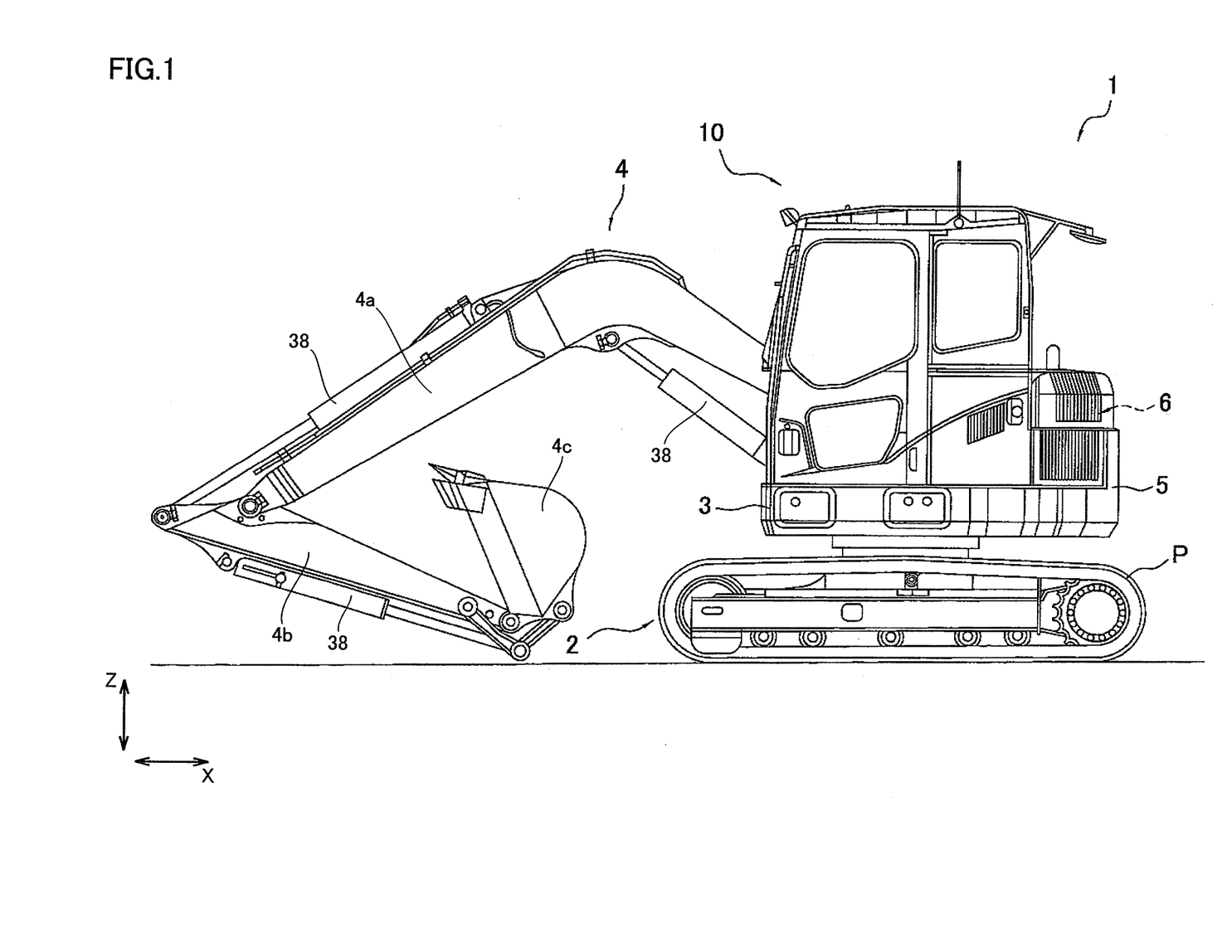
FIG. 1 is a side view showing a configuration of a hydraulic excavator according to one embodiment of the present invention.

FIG. 1 is a side view showing a configuration of a hydraulic excavator according to one embodiment of the present invention. A hydraulic excavator 1 according to the present embodiment mainly includes a lower traveling unit 2, an upper revolving unit 3, a work implement 4, a counter weight 5, a cooling unit 6, and a cab 10, as shown in FIG. 1. Lower traveling unit 2 and upper revolving unit 3 constitute a work vehicle main body.

Lower traveling unit 2 has a pair of crawler belts P wound around both the left and right ends in the traveling direction. Lower traveling unit 2 is configured to be self-propelled by rotation of the pair of crawler belts P.

Upper revolving unit 3 is mounted on lower traveling unit 2 revolvably in any direction. Upper revolving unit 3 includes a cab 10, which is a driver's cabin for an operator of hydraulic excavator 1 to get on and off, at the front left side. Upper revolving unit 3 includes an engine compartment for accommodating an engine and counter weight 5 on the rear side.

It should be noted that, in the present embodiment, when an operator is seated in cab 10, the front side (front surface side) of the operator will be assumed as the front side of upper revolving unit 3, the opposite side thereto, namely, the rear side of the operator will be assumed as the rear side of upper revolving unit 3, the left side of the seated operator as the left side of upper revolving unit 3, and the right side of the seated operator as the right side of upper revolving unit 3. In the following description, back and forth, right and left of upper revolving unit 3 shall be in agreement with those of hydraulic excavator 1. In the drawings which will be described below, the front-back direction is indicated by an arrow X in the drawings, the left-right direction by an arrow Y in the drawings, and the vertical direction by an arrow Z in the drawings.

Work implement 4 for performing operation such as earth excavation is pivotally supported by upper revolving unit 3 so as to be swingable in the upward and downward directions. Work implement 4 has a boom 4a mounted swingably in the upward and downward directions at a substantially central portion on the front side of upper revolving unit 3, an arm 4b mounted swingably in the forward and backward directions at a leading end portion of boom 4a, and a bucket 4c mounted swingably in the forward and backward directions at a leading end portion of arm 4b. Boom 4a, arm 4b and bucket 4c are each configured to be swingably driven by a hydraulic cylinder 38.

Work implement 4 is provided relative to cab 10 on the right side which is one lateral side of cab 10 such that the leading end portion of work implement 4 is visible to the operator in cab 10. Cab 10 is arranged on a lateral side of a mounting portion of work implement 4. It should be noted that the arrangement of cab 10 and work implement 4 is not limited to the example shown in FIG. 1. For example, work implement 4 may be arranged on the front side of upper revolving unit 3, and cab 10 may be provided on the rear side of work implement 4 (substantially at the center of upper revolving unit 3).

Counter weight 5 is a weight arranged at the rear of upper revolving unit 3 in order to achieve balance of the vehicle body at the time of digging and the like. Cooling unit 6 is housed in an engine compartment at the rear of upper revolving unit 3. The configuration of cooling unit 6 will be described later in detail.

Figure 2:
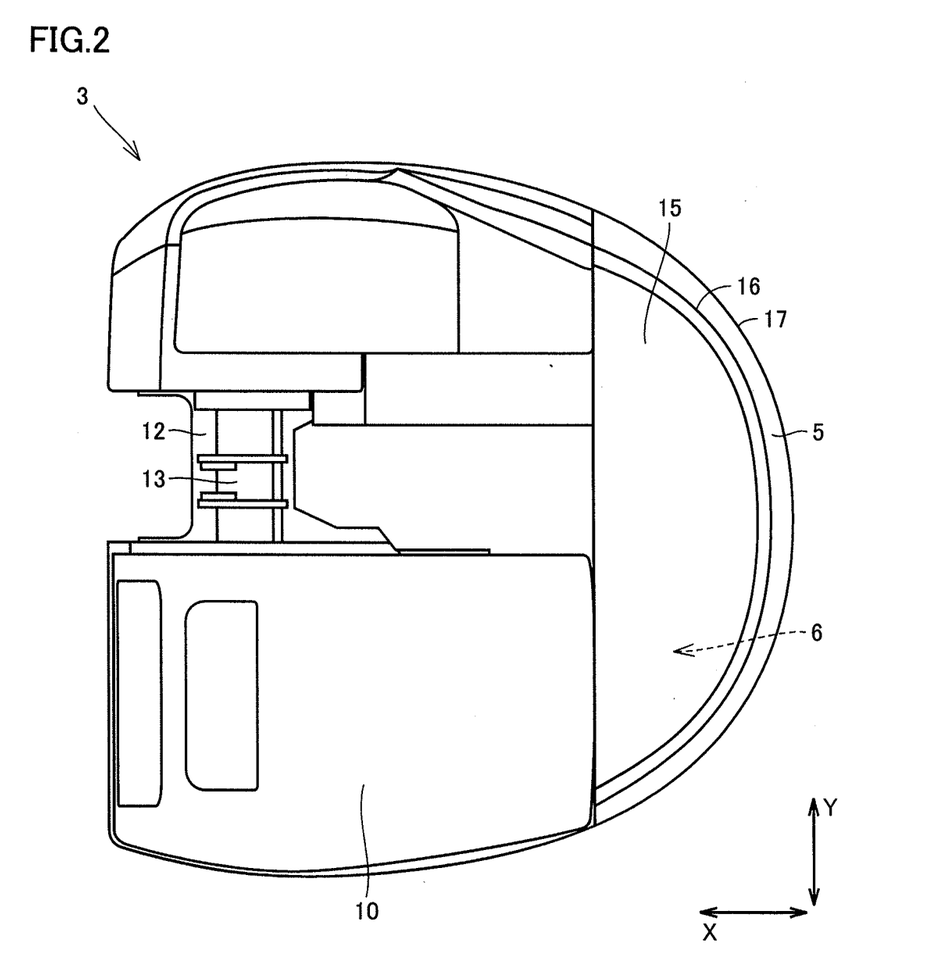
FIG. 2 is a plan view of an upper revolving unit constituting the hydraulic excavator of FIG. 1.
Figure 3:
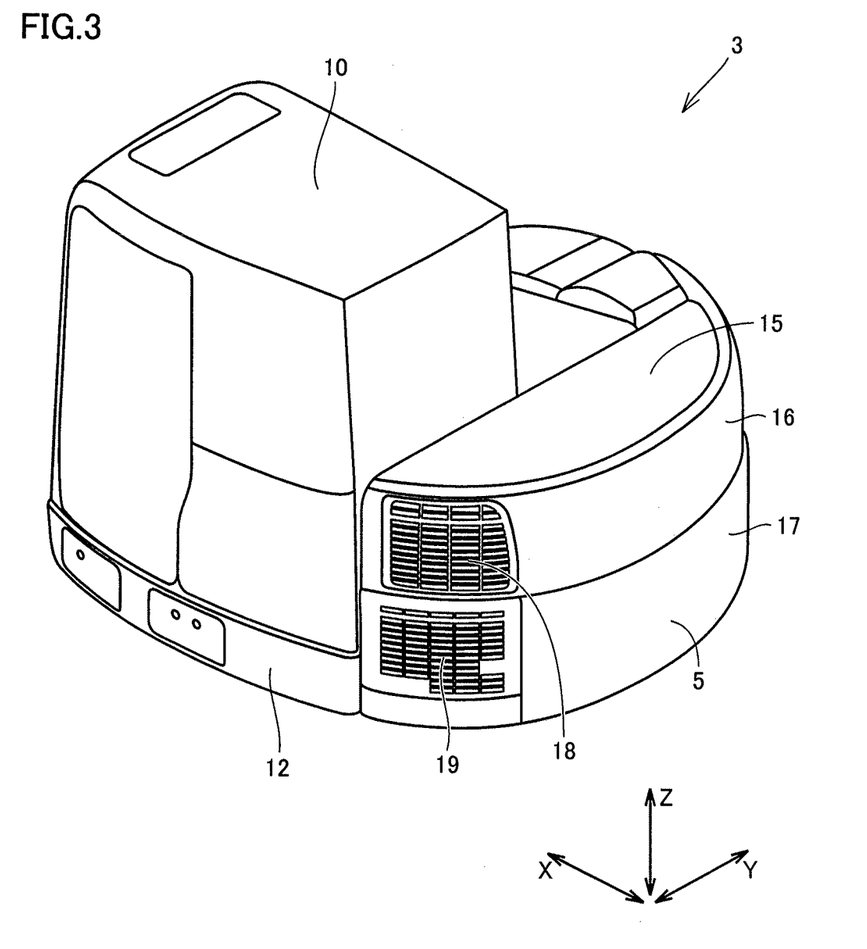
FIG. 3 is a perspective view of the upper revolving unit constituting the hydraulic excavator of FIG. 1.

FIG. 2 is a plan view of upper revolving unit 3 constituting hydraulic excavator 1 of FIG. 1. FIG. 3 is a perspective view of upper revolving unit 3 constituting hydraulic excavator 1 of FIG. 1. Referring to FIGS. 2 and 3, the engine compartment at the backside of upper revolving unit 3 is covered from above with an upper plate 15, and is covered laterally with an upper lateral plate 16 which is an upper-side lateral plate and a lower lateral plate 17 which is a lower-side lateral plate. Upper plate 15 defines the upper outer shape of the engine compartment. Upper lateral plate 16 and lower lateral plate 17 define the outer shape on the right, left and rear sides of the engine compartment. Upper lateral plate 16 has formed therein air vents 18 through which the inside and the outside of the engine compartment communicate with each other. Lower lateral plate 17 has formed therein air vents 19 through which the inside and the outside of the engine compartment communicate with each other. Air vents 18 and 19 are formed on the rear left side of upper revolving unit 3.

As shown in FIG. 3, upper revolving unit 3 includes a revolving frame 12. Revolving frame 12 is arranged above lower traveling unit 2 shown in FIG. 1, and is mounted revolvably relative to lower traveling unit 2. Work implement 4, cab 10, counter weight 5, and cooling unit 6 are mounted on revolving frame 12, and are arranged on the upper surface of revolving frame 12.

A center bracket 13 supporting the base end section of work implement 4 is provided at the central portion of the front end of revolving frame 12. Counter weight 5 is arranged to cover the rear side of cooling unit 6.

Figure 4:
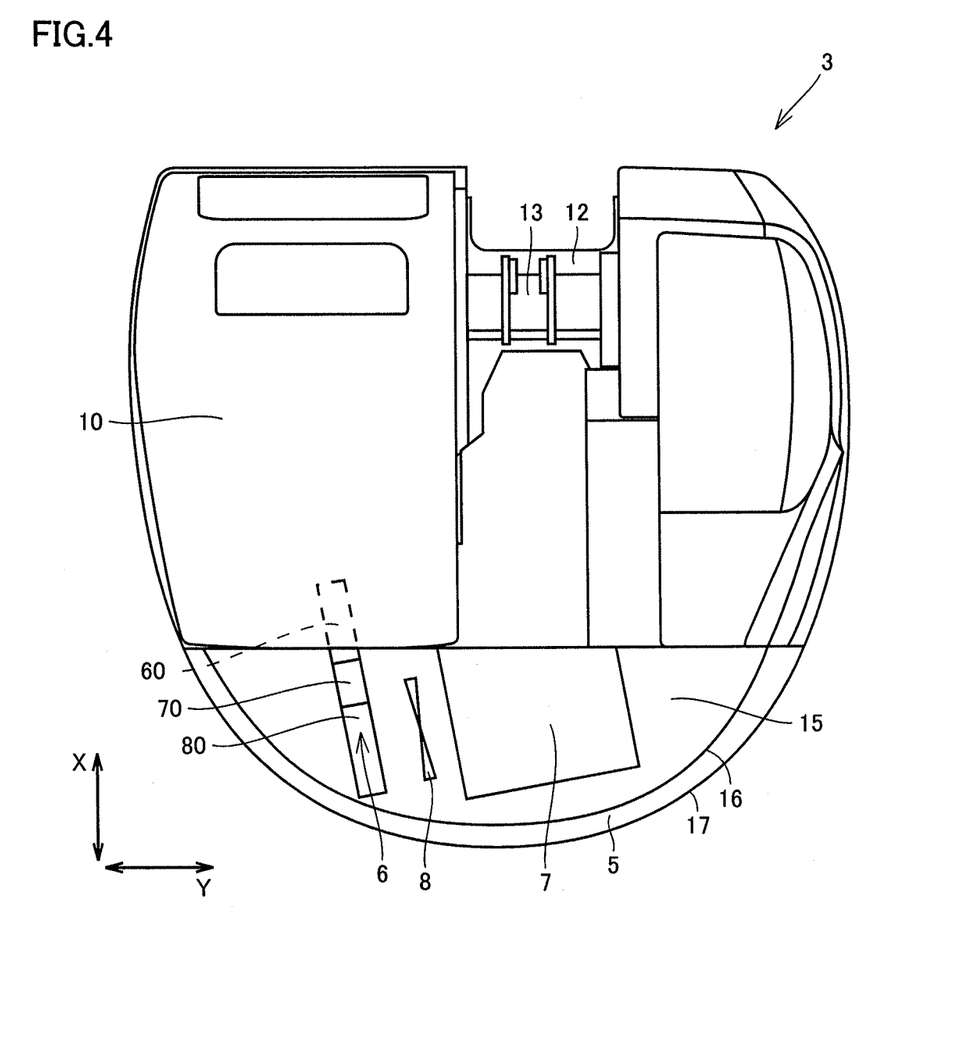
FIG. 4 is a plan view showing a configuration in an engine compartment mounted on a revolving frame.

FIG. 4 is a plan view showing a configuration in the engine compartment mounted on revolving frame 12. Referring to FIG. 4, cooling unit 6, an engine 7 and a fan 8 are housed in the engine compartment defined by being covered from above and laterally with upper plate 15, upper lateral plate 16 and lower lateral plate 17.

In the engine compartment, cooling unit 6, fan 8 and engine 7 are arranged in the presented order from the left side to the right side. Cooling unit 6 is arranged on the left side with respect to fan 8, that is, on the side closer to air vents 18 and 19. Engine 7 is arranged on the right side with respect to fan 8, that is, on the side away from air vents 18 and 19. Fan 8 is rotationally driven by engine 7 to produce an air flow passing through the engine compartment.

Cooling unit 6 is mounted on revolving frame 12 so as to overlap cab 10 when viewed in plan view. Cooling unit 6 is formed to include an oil cooler 60, an intercooler 70 and a radiator 80. Oil cooler 60 is a cooling device intended to cool a hydraulic fluid supplied to various kinds of hydraulic actuators mounted on hydraulic excavator 1, such as hydraulic cylinder 38. Intercooler 70 is a cooling device intended to cool compressed air supplied to engine 7. Radiator 80 is a cooling device intended to cool cooling water of engine 7. Oil cooler 60, intercooler 70 and radiator 80 are arranged in the presented order from the front side to the rear side.

Figure 5:
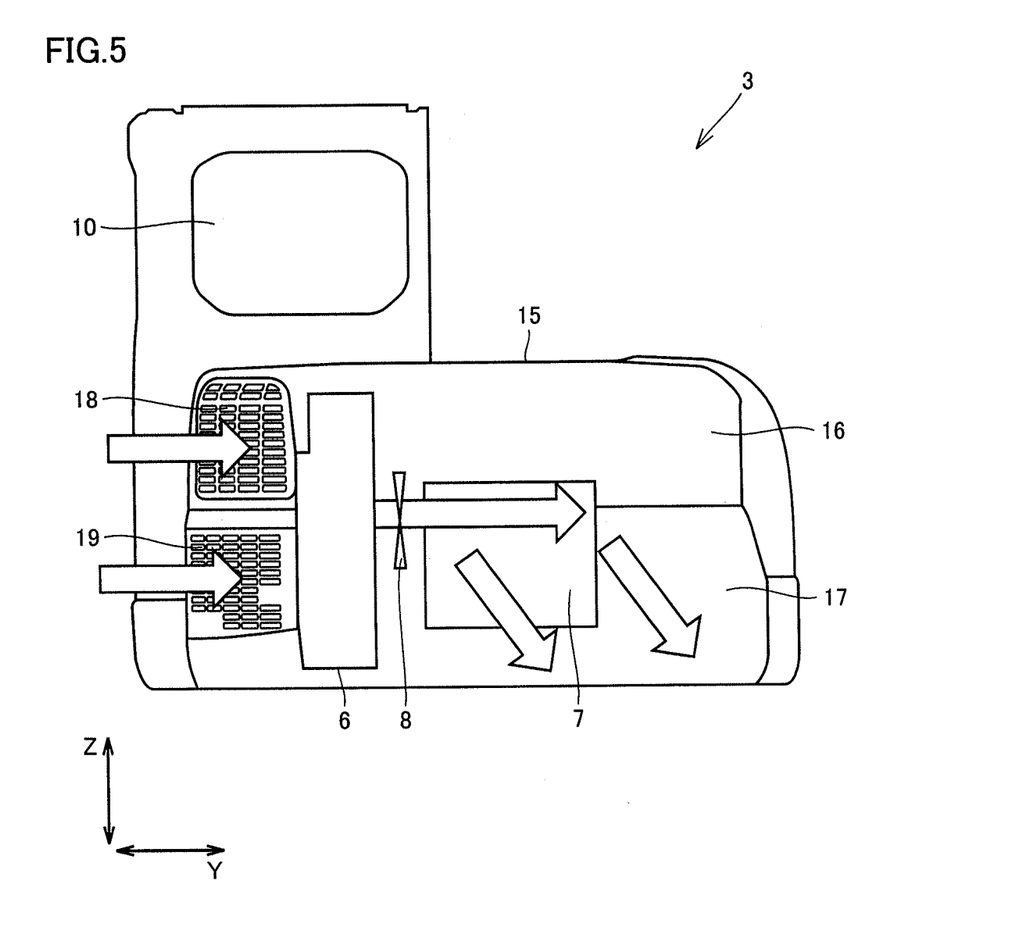
FIG. 5 is a rear view showing a configuration in the engine compartment mounted on the revolving frame.

FIG. 5 is a rear view showing a configuration in the engine compartment mounted on revolving frame 12. Blank arrows in FIG. 5 indicate the air flow produced by fan 8 rotationally driven by engine 7.

When fan 8 is rotationally driven, air flows into the engine compartment from the outside of upper revolving unit 3 through air vents 18 and 19 formed in upper lateral plate 16 and lower lateral plate 17, respectively. Air flows passing through cooling unit 6, fan 8 and engine 7 in the presented order. Cooling unit 6 is arranged on the upstream side of the air flow with respect to fan 8. Engine 7 is arranged on the downstream side of the air flow with respect to fan 8. Air further passes through the air vents formed in the lower part of upper revolving unit 3, and flows out of the engine compartment to the outside of upper revolving unit 3.

Figure 6:
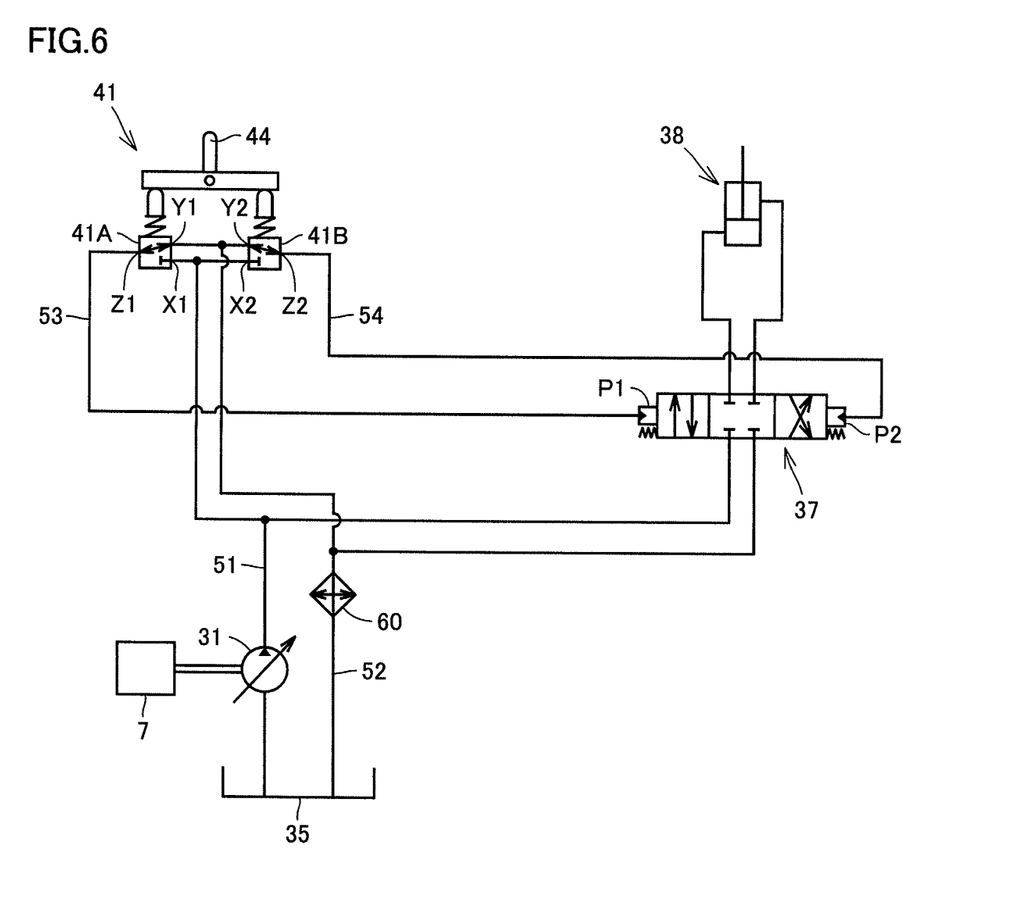
FIG. 6 is a hydraulic circuit diagram applied to the hydraulic excavator of FIG. 1.

FIG. 6 is a hydraulic circuit diagram applied to hydraulic excavator 1 of FIG. 1. In the hydraulic system of the present embodiment shown in FIG. 6, a hydraulic pump 31 is driven by engine 7. Hydraulic pump 31 serves as a drive source for driving a hydraulic actuator, such as hydraulic cylinder 38, for driving work implement 4 shown in FIG. 1. A hydraulic fluid discharged from hydraulic pump 31 is supplied to hydraulic cylinder 38 through a pilot switching valve 37. The hydraulic fluid supplied to hydraulic cylinder 38 is discharged to a tank 35 through pilot switching valve 37. Tank 35 stores the hydraulic fluid therein.

Pilot switching valve 37 controls supply and discharge of the hydraulic fluid to hydraulic cylinder 38. Pilot switching valve 37 has a pair of pilot control ports p1 and p2. Pilot switching valve 37 is controlled by the hydraulic fluid having a predetermined pilot pressure being supplied to each of pilot control ports p1 and p2.

The pilot pressure applied to pilot switching valve 37 is controlled by the operation of a control lever device 41. Control lever device 41 has a control lever 44 operated by an operator, a first pilot pressure control valve 41A and a second pilot pressure control valve 41B. Pilot pressure control valves 41A and 41B for controlling driving of hydraulic cylinder 38 are connected to control lever 44.

First pilot pressure control valve 41A has a first pump port X1, a first tank port Y1 and a first supply/discharge port Z1. First pump port X1 is connected to a pump channel 51. First tank port Y1 is connected to a tank channel 52. Pump channel 51 and tank channel 52 are connected to tank 35 storing the hydraulic fluid. Hydraulic pump 31 is provided in pump channel 51. First supply/discharge port Z1 is connected to a first pilot tube passage 53.

First pilot pressure control valve 41A is switched between an output state and a discharging state in accordance with the operation of control lever 44. In the output state, first pilot pressure control valve 41A causes first pump port X1 and first supply/discharge port Z1 to communicate with each other, so that a hydraulic fluid is output to first pilot tube passage 53 through first supply/discharge port Z1 at a pressure in accordance with the amount of operation of control lever 44. In the discharging state, first pilot pressure control valve 41A causes first tank port Y1 and first supply/discharge port Z1 to communicate with each other.

Second pilot pressure control valve 41B has a second pump port X2, a second tank port Y2 and a second supply/discharge port Z2. Second pump port X2 is connected to pump channel 51. Second tank port Y2 is connected to tank channel 52. Second supply/discharge port Z2 is connected to a second pilot tube passage 54.

Second pilot pressure control valve 41B is switched between an output state and a discharging state in accordance with the operation of control lever 44. In the output state, second pilot pressure control valve 41B causes second pump port X2 and second supply/discharge port Z2 to communicate with each other, so that a hydraulic fluid is output to second pilot tube passage 54 through second supply/discharge port Z2 at a pressure in accordance with the amount of operation of control lever 44. In the discharging state, second pilot pressure control valve 41B causes second tank port Y2 and second supply/discharge port Z2 to communicate with each other.

First pilot pressure control valve 41A and second pilot pressure control valve 41B are paired, and correspond to operating directions of control lever 44 opposite to each other. For example, first pilot pressure control valve 41A corresponds to an inclined operation of control lever 44 in the forward direction, and second pilot pressure control valve 41B corresponds to an inclined operation of control lever 44 in the backward direction. First pilot pressure control valve 41A and second pilot pressure control valve 41B are selected alternatively by the operation of control lever 44. That is, when first pilot pressure control valve 41A is in the output state, second pilot pressure control valve 41B is in the discharging state. When first pilot pressure control valve 41A is in the discharging state, second pilot pressure control valve 41B is in the output state.

First pilot pressure control valve 41A controls supply and discharge of the hydraulic fluid to first pilot control port p1 with pilot switching valve 37. Second pilot pressure control valve 41B controls supply and discharge of the hydraulic fluid to second pilot control port p2 with pilot switching valve 37. In accordance with the operation of control lever 44, supply and discharge of the hydraulic fluid to and from hydraulic cylinder 38 is controlled, and extension and contraction of hydraulic cylinder 38 is controlled. Accordingly, the operation of work implement 4 is controlled in accordance with the operation of control lever 44.

Oil cooler 60 described above is provided in tank channel 52 serving as a channel of the hydraulic fluid flowing towards tank 35. Oil cooler 60 cools the hydraulic fluid discharged through first pilot pressure control valve 41A or second pilot pressure control valve 41B and flowing back to tank 35. Oil cooler 60 also cools the hydraulic fluid discharged through pilot switching valve 37 and flowing back to tank 35. As shown in FIG. 6, oil cooler 60 has a function of cooling the hydraulic fluid supplied to hydraulic cylinder 38.

Figure 7:
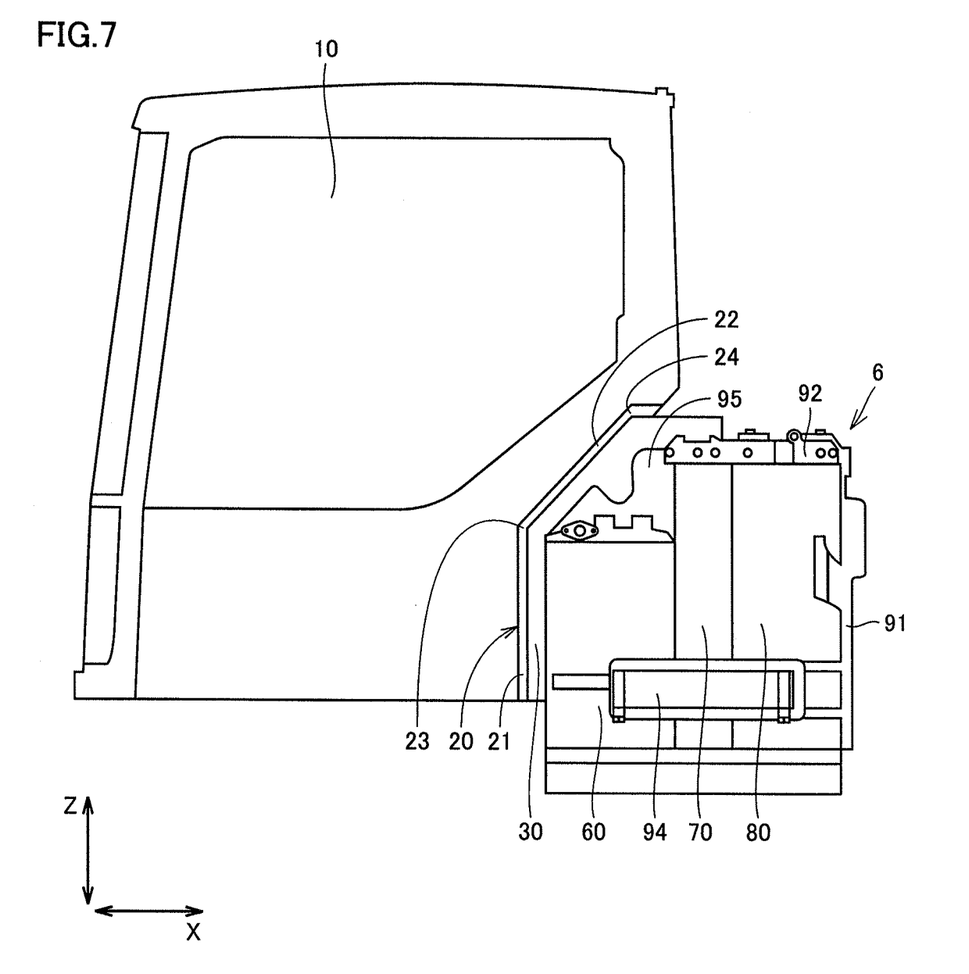
FIG. 7 is a side view showing a configuration of and around a cab in the hydraulic excavator of FIG. 1.

FIG. 7 is a side view showing a configuration of and around cab 10 in hydraulic excavator 1 of FIG. 1. As shown in FIG. 7, cab 10 has a rear wall 20. Rear wall 20 has an upright wall part 21 extending in the vertical direction as indicated by an arrow Z in FIG. 7, and an inclined wall part 22 extending at an inclination with respect to the vertical direction. Upright wall part 21 and inclined wall part 22 are connected at a connecting portion 23. Connecting portion 23 constitutes the upper edge of upright wall part 21 and constitutes the lower edge of inclined wall part 22. Connecting portion 23 constitutes one edge of inclined wall part 22 that is connected to upright wall part 21. Inclined wall part 22 has the other edge 24 on the opposite side of connecting portion 23. Connecting portion 23 may be a portion obtained by bonding flat plate-like upright wall part 21 and flat plate-like inclined wall part 22 by welding or the like. Alternatively, connecting portion 23 may be a bent portion obtained by bending a piece of flat plate to form upright wall part 21 and inclined wall part 22.

Inclined wall part 22 is connected to the upper edge of upright wall part 21. Inclined wall part 22 is inclined with respect to the vertical direction so as to be directed toward the rear side with distance from connecting portion 23. Inclined wall part 22 is inclined to the rear upper side with respect to the upper edge of upright wall part 21 extending in the vertical direction. Rear wall 20 has a bent shape when viewed in side view with upright wall part 21 and inclined wall part 22 being connected to each other at their edges. Cab 10 is formed in a shape with the lower part of rear wall 20 retracted into cab 10.

Cooling unit 6 is arranged on the rear side of rear wall 20 of cab 10. Oil cooler 60, intercooler 70 and radiator 80 included in cooling unit 6 are arranged in the presented order from the front side to the rear side when viewed in side view. Oil cooler 60 is arranged below inclined wall part 22 of rear wall 20. Oil cooler 60 is arranged in proximity to upright wall part 21 of rear wall 20 of cab 10, and is arranged to overlap cab 10 when viewed in plan view.

Cooling unit 6 includes a case part 91, an attachment plate 92 and a fuel cooler 94. Case part 91 is a substantially box-shaped frame to which oil cooler 60, intercooler 70 and radiator 80 are attached. Attachment plate 92 is attached to the upper parts of intercooler 70 and radiator 80 to integrate intercooler 70 and radiator 80. Fuel cooler 94 is a cooling device for cooling fuel or the like not burnt in engine 7, and is arranged at the lower part of cooling unit 6 over the side faces of oil cooler 60, intercooler 70 and radiator 80.

A sealing material 30 is provided between upright wall part 21 of rear wall 20 of cab 10 and oil cooler 60. A baffle plate 95 is provided between inclined wall part 22 of rear wall 20 of cab 10 and oil cooler 60. A sealing material is also provided between radiator 80 and counter weight 5. These sealing material 30 and baffle plate 95 fill an air gap around cooling unit 6. Therefore, an air flow that takes a shortcut through cooling unit 6 is suppressed.

Figure 8:
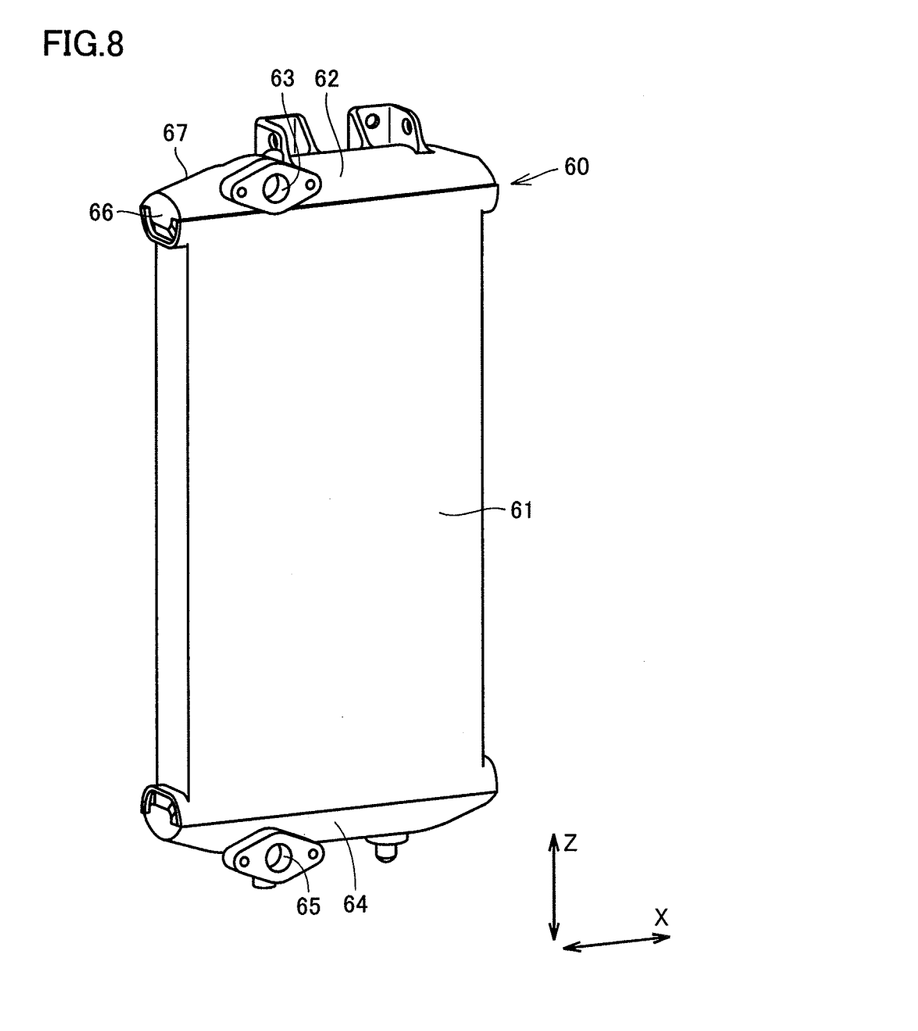
FIG. 8 is a perspective view of an oil cooler mounted on the hydraulic excavator of FIG. 1.

FIG. 8 is a perspective view of oil cooler 60 mounted on hydraulic excavator 1 of FIG. 1. Referring to FIG. 8, oil cooler 60 includes a core part 61, an upper tank 62 arranged over core part 61, and a lower tank 64 arranged under core part 61. Upper tank 62 has a connection port 63 to which an oil pipe constituting tank channel 52 shown in FIG. 6 is connected. Lower tank 64 has a connection port 65 to which the oil pipe constituting tank channel 52 shown in FIG. 6 is connected.

Core part 61 has a plurality of tubes of small diameter, each having an upper end connected to upper tank 62 and a lower end connected to lower tank 64, and fins arranged between adjacent tubes. The hydraulic fluid flows into lower tank 64 through connection port 65, and flows from lower tank 64 toward upper tank 62 through the tubes of core part 61. The hydraulic fluid flowing through core part 61 is cooled by exchanging heat with air flowing through core part 61 in association with the driving of fan 8. With the hydraulic fluid passing through core part 61 radiating heat to the air flow, oil cooler 60 cools the hydraulic fluid. The hydraulic fluid cooled in core part 61 is temporarily stored in upper tank 62, and flows out of upper tank 62 through connection port 63.

The outer surface of upper tank 62 has a front surface 66 and an inclined surface 67. Inclined surface 67 is connected to the upper edge of front surface 66, and is inclined to the rear upper side with respect to the upper edge of front surface 66. Upper tank 62 has an outer shape obtained by collapsing a cylinder in the vertical direction as a whole. As compared with a cylinder, the deformation of the tubular shape of upper tank 62 is larger toward the opposite ends, with the result that inclined surface 67 is formed as the upper surface of upper tank 62. Inclined surface 67 of the first embodiment has a curved surface shape curved to project upwardly.

Figure 9:
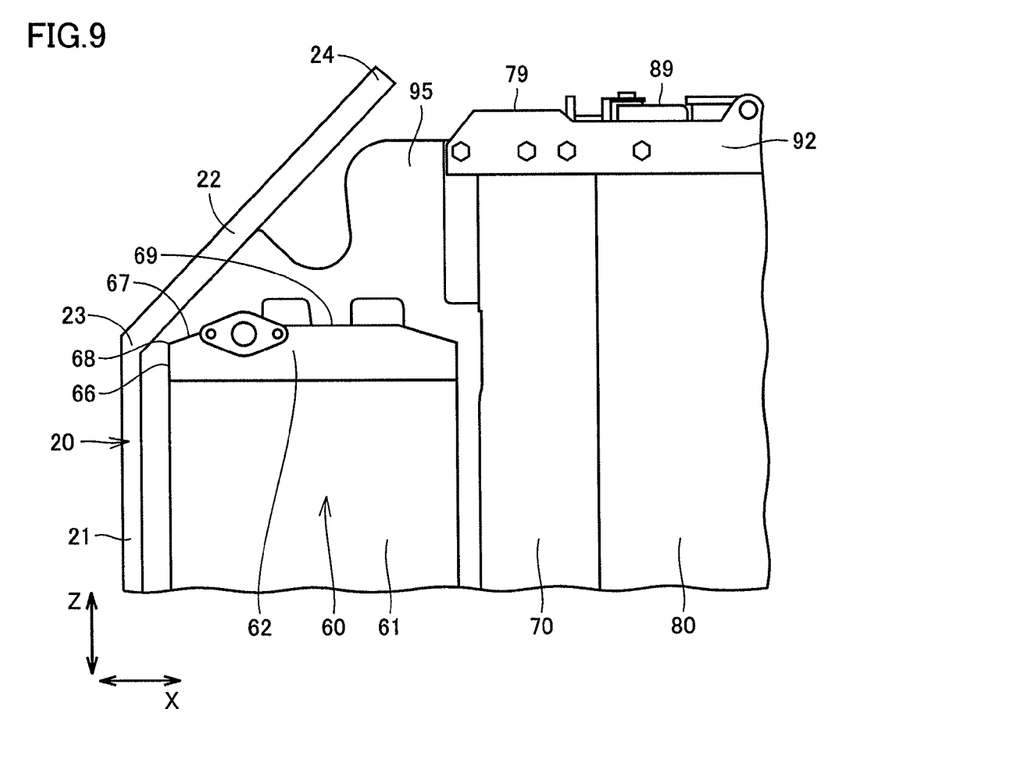
FIG. 9 is a side view showing a configuration of and around a rear wall of the cab in the hydraulic excavator of FIG. 1.

FIG. 9 is a side view showing a configuration of and around rear wall 20 of cab 10 in hydraulic excavator 1 of FIG. 1. In the state shown in FIG. 9 where oil cooler 60 is housed in the engine compartment, front surface 66 of upper tank 62 extends in the vertical direction, and faces upright wall part 21 of rear wall 20 of cab 10. Inclined surface 67 of upper tank 62 faces inclined wall part 22 of rear wall 20 of cab 10. In the side view shown in FIG. 9, front surface 66 and inclined surface 67 of upper tank 62 are connected to each other at a connecting portion 68. Connecting portion 68 constitutes the upper edge of front surface 66, and constitutes the lower edge of inclined surface 67. Connecting portion 68 is arranged below the height position of other edge 24 of inclined wall part 22.

Inclined surface 67 is connected to the upper edge of front surface 66. Inclined surface 67 is inclined with respect to the vertical direction so as to be directed toward the rear side with distance from connecting portion 68. Inclined surface 67 is inclined to the rear side with respect to front surface 66 extending in the vertical direction. Upper tank 62 has a bent outer shape when viewed in side view with front surface 66 and inclined surface 67 being connected to each other at their edges. Connecting portion 68 may be a portion obtained by bonding front surface 66 and inclined surface 67 by welding or the like.

Oil cooler 60 has an uppermost surface 69 positioned at the highest in the vertical direction. Intercooler 70 arranged on the rear side of oil cooler 60 has an uppermost surface 79. Radiator 80 arranged on the rear side of intercooler 70 has an uppermost surface 89. Uppermost surfaces 79 and 89 of intercooler 70 and radiator 80 are arranged at a higher position than the uppermost surface of oil cooler 60 in the vertical direction.

Figure 10:
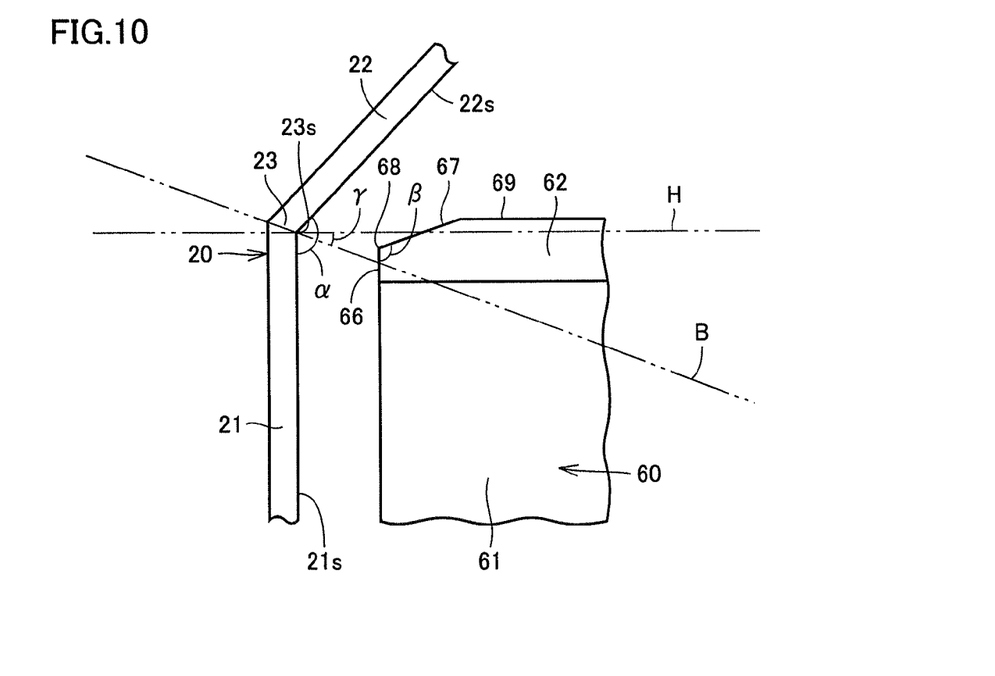
FIG. 10 is a schematic view showing an arrangement of the rear wall of the cab and the oil cooler.

FIG. 10 is a schematic view showing an arrangement of rear wall 20 of cab 10 and oil cooler 60. FIG. 10 schematically illustrates the outer shape and arrangement of rear wall 20 of cab 10 and oil cooler 60 when viewed in side view. Sealing material 30 and baffle plate 95 provided in the gap between oil cooler 60 and rear wall 20 are omitted from the illustration in FIG. 10 for the purpose of simplification.

Upright wall part 21 of rear wall 20 has a surface 21s on the rear side. Inclined wall part 22 of rear wall 20 has a surface 22s on the rear side. Surface 21s of upright wall part 21 and surface 22s of inclined wall part 22 are connected to each other at a connecting portion 23s. Surfaces 21s and 22s have a planar shape. Surfaces 21s and 22s intersect at connecting portion 23s. When rear wall 20 is viewed in side view, the angle formed by surface 21s of upright wall part 21 and surface 22s of inclined wall part 22 is an angle α shown in FIG. 10.

When oil cooler 60 mounted in the engine compartment is viewed in side view, the angle formed by front surface 66 and inclined surface 67 of upper tank 62 is an angle β shown in FIG. 10. Rear wall 20 of cab 10 and upper tank 62 of oil cooler 60 are formed such that angle α formed by surface 21s of upright wall part 21 and surface 22s of inclined wall part 22 is more than or equal to angle β formed by front surface 66 and inclined surface 67 of upper tank 62.

A straight line H indicated by a chain double-dashed line in FIG. 10 shows a line passing through connecting portion 23s where surface 21s and surface 22s intersect with each other and extending in the horizontal direction perpendicular to the vertical direction. That is, straight line H indicates the height position of connecting portion 23. A straight line B indicated by a chain double-dashed line in FIG. 10 shows a bisector of angle α formed by surface 21s of upright wall part 21 and surface 22s of inclined wall part 22. Connecting portion 68 between front surface 66 and inclined surface 67 of upper tank 62 is arranged between straight line B indicating the bisector of the angle (angle α) formed by upright wall part 21 and inclined wall part 22 and straight line H indicating the height position of the upper edge of upright wall part 21, in the vertical direction. Straight lines H and B form an angle γ.

Next, the effects of the present embodiment will be described.

According to the present embodiment, rear wall 20 has upright wall part 21 and inclined wall part 22, as shown in FIG. 10. Upright wall part 21 extends in the vertical direction. Inclined wall part 22 is connected to the upper edge of upright wall part 21, and is inclined to the rear upper side with respect to connecting portion 23 positioned at the upper edge of upright wall part 21. The outer surface of oil cooler 60 has front surface 66 and inclined surface 67. Front surface 66 faces upright wall part 21 of rear wall 20, and extends in the vertical direction. Inclined surface 67 is connected to the upper edge of front surface 66, and is inclined to the rear upper side with respect to connecting portion 68 positioned at the upper edge of front surface 66. Angle α formed by upright wall part 21 and inclined wall part 22 is more than or equal to angle β formed by front surface 66 and inclined surface 67.

Inclined wall part 22 has connecting portion 23 as one edge connected to upright wall part 21 and other edge 24 on the opposite side of connecting portion 23, as shown in FIG. 9. Connecting portion 68 which is an upper edge of front surface 66 of oil cooler 60 is arranged below the height position of other edge 24.

Then, interference between inclined wall part 22 of rear wall 20 of cab 10 and oil cooler 60 can be suppressed. Therefore, oil cooler 60 can be arranged in proximity to rear wall 20. Since inclined surface 67 is provided on the outer surface of upper tank 62 among the outer surfaces of oil cooler 60, the rectangular shape of core part 61 when viewed in side view can be maintained. Moreover, the dimensions of core part 61 can be maintained without the need to decrease the dimension of core part 61 in the height direction for preventing interference between oil cooler 60 and rear wall 20. Therefore, hydraulic excavator 1 can be achieved which allows the cooling device to be arranged in proximity to rear wall 20 of cab 10 while maintaining cooling performance of the hydraulic fluid in core part 61.

Moreover, as shown in FIG. 10, connecting portion 68 positioned at the upper edge of front surface 66 of oil cooler 60 is located between straight line B indicating the bisector of angle α formed by upright wall part 21 and inclined wall part 22 and straight line H indicating the height position of the upper edge of upright wall part 21, in the vertical direction. By defining the upper edge of front surface 66 of oil cooler 60 at a position higher than the bisector of angle α and below the upper edge of upright wall part 21, contact between oil cooler 60 and rear wall 20 can be prevented while ensuring space to be filled with sealing material 30 between oil cooler 60 and rear wall 20 of cab 10.

Since the height position of the upper edge of upright wall part 21 and the height position of the upper edge of front surface 66 of oil cooler 60 can be aligned by bringing the height position of the upper edge of front surface 66 of upper tank 62 close to the height position of the upper edge of upright wall part 21, the position where the outer surface of oil cooler 60 is bent can be arranged in closer proximity to the position where rear wall 20 is bent. Therefore, the upper end of core part 61 of oil cooler 60 can be arranged at a higher position. The area of core part 61 can thereby be increased to further improve cooling performance of oil cooler 60. From a viewpoint of maximizing the area of core part 61, it is desirable to align the height position of the upper edge of the front surface with the upper edge of upright wall part 21.

Moreover, as shown in FIG. 9, intercooler 70 and radiator 80 are arranged on the rear side of oil cooler 60. Uppermost surface 79 of intercooler 70 and uppermost surface 89 of radiator 80 are arranged at a position higher than uppermost surface 69 of oil cooler 60. Then, intercooler 70 and radiator 80 can be increased in dimension in the height direction as compared with oil cooler 60, in accordance with the inclination of inclined wall part 22 of rear wall 20. Accordingly, the core parts of intercooler 70 and radiator 80 can be increased in area, so that intercooler 70 and radiator 80 can be increased in cooling capacity.

Furthermore, as shown in FIG. 7, sealing material 30 is provided between rear wall 20 of cab 10 and front surface 66 and inclined surface 67 of oil cooler 60. If oil cooler 60 has a rectangular shape when viewed in side view in the case where sealing material 30 is present between rear wall 20 of cab 10 and the outer surface of oil cooler 60, the corner portions of oil cooler 60 may be brought into line contact with sealing material 30 to cause stress concentration, which may damage sealing material 30. Because oil cooler 60 has inclined surface 67, sealing material 30 can be brought into surface contact with inclined surface 67. Accordingly, stress concentration can be relieved to suppress damage to sealing material 30.

Second Embodiment

Figure 11:
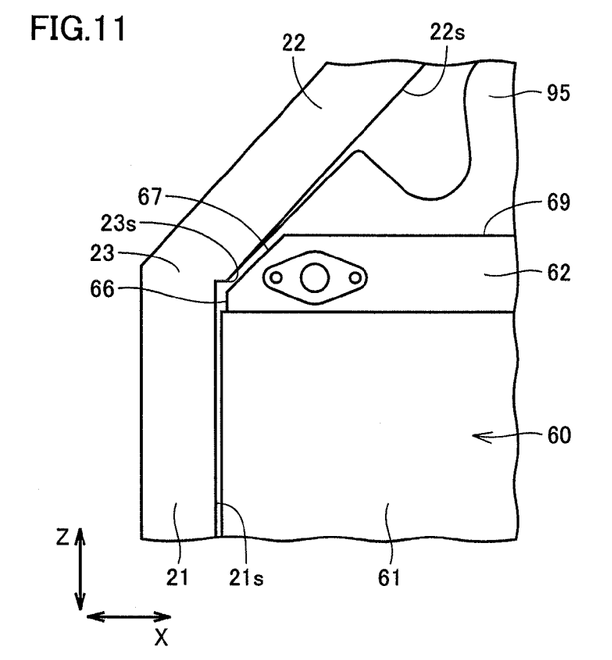
FIG. 11 is a side view showing a configuration of and around a rear wall of a cab of a second embodiment.
Figure 12:
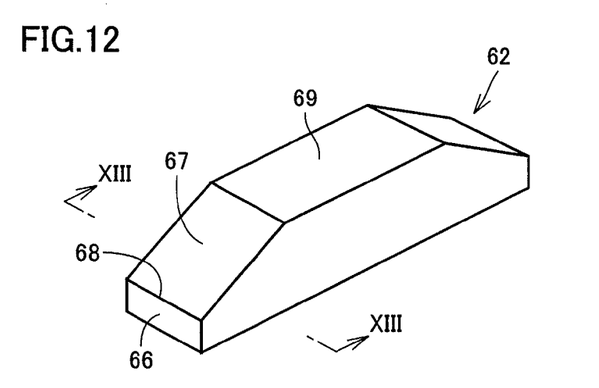
FIG. 12 is a perspective view showing an upper tank of an oil cooler of the second embodiment.
Figure 13:
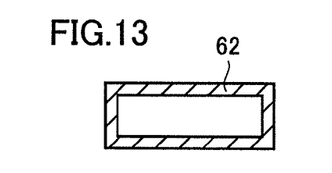
FIG. 13 is a cross sectional view of the upper tank taken along the line XIII-XIII shown in FIG. 12.

FIG. 11 is a side view showing a configuration of and around rear wall 20 of cab 10 of a second embodiment. FIG. 12 is a perspective view showing upper tank 62 of oil cooler 60 of the second embodiment. FIG. 13 is a cross sectional view of upper tank 62 taken along the line XIII-XIII shown in FIG. 12.

Upper tank 62 of oil cooler 60 of the second embodiment has a trapezoidal outer shape when viewed in side view similar to that of the first embodiment. However, upper tank 62 of the second embodiment shown in FIG. 12 has an outer surface formed by a combination of planes, while upper tank 62 of the first embodiment shown in FIG. 8 has a shape obtained by collapsing a cylinder in the radial direction. That is, upper tank 62 of the second embodiment has front surface 66, inclined surface 67 and uppermost surface 69, all of which have a planar shape. Therefore, the sectional shape of upper tank 62 of the second embodiment has a rectangular outer shape as shown in FIG. 13. The cross section of upper tank 62 shown in FIG. 13 corresponds to a cross section perpendicular to the front-back direction when oil cooler 60 is mounted in the engine compartment. Connecting portion 68 may be a bent portion obtained by bending a flat-plate-like material to form front surface 66 and inclined surface 67.

In the second embodiment, the angle (angle α shown in FIG. 10) formed by surfaces 21s and 22s of upright wall part 21 and inclined wall part 22 of rear wall 20 of cab 10 is equal to the angle (angle 13 shown in FIG. 10) formed by front surface 66 and inclined surface 67 of upper tank 62. Upper tank 62 of the second embodiment is formed such that inclined surface 67 is in parallel to surface 22s of inclined wall part 22. Inclined surface 67 of upper tank 62 of the second embodiment has a portion extending in parallel to inclined wall part 22 of rear wall 20.

According to above-described hydraulic excavator 1 of the second embodiment, inclined surface 67 of upper tank 62 has a portion extending in parallel to inclined wall part 22 of rear wall 20, as shown in FIG. 11. Accordingly, oil cooler 60 can be arranged close to both upright wall part 21 and inclined wall part 22 of rear wall 20. Therefore, the shape of core part 61 can be kept to maintain cooling performance of oil cooler 60, and the spacing between rear wall 20 and oil cooler 60 can be made even smaller.

If front surface 66 is in parallel to upright wall part 21, and inclined surface 67 is in parallel to inclined wall part 22, connecting portion 68 of oil cooler 60 can be arranged on the bisector of angle α shown in FIG. 10 by arranging oil cooler 60 such that the distance between front surface 66 and upright wall part 21 is equal to the distance between inclined surface 67 and inclined wall part 22. Therefore, positioning of oil cooler 60 with respect to rear wall 20 becomes easier, which can improve assembly of oil cooler 60 into the engine compartment.

Moreover, as shown in FIGS. 12 and 13, the cross section of upper tank 62 perpendicular to the front-back direction has a rectangular outer shape. Then, upper tank 62 can have a larger capacity than upper tank 62 of the first embodiment having an outer shape obtained by collapsing a cylinder. Therefore, it becomes even easier to ensure the capacity of upper tank 62 even when upper tank 62 is provided with inclined surface 67. It should be noted that upper tank 62 of the first embodiment is desirable for its superiority in pressure resistance and easiness of manufacturing because of fewer welding spots.

It should be noted that the above description has provided an example in which the outer surface of upper tank 62 of oil cooler 60 has inclined surface 67, and the angle formed by front surface 66 and inclined surface 67 among the outer surfaces of upper tank 62 is defined as compared with the angle formed by upright wall part 21 and inclined wall part 22 of rear wall 20. The cooling device according to the present invention having an inclined surface is not limited to oil cooler 60. That is, intercooler 70 or radiator 80 described in the embodiments may be arranged at the forefront of cooling unit 6, and may be formed into a shape having an inclined surface. The idea of the present invention is suitably applicable to any cooling device that has a core part in which a medium is cooled by heat exchange between the medium flowing through the cooling device and air passing through the cooling device, and having tanks over and under the core part.

It should be understood that the embodiments disclosed herein are illustrative and non-restrictive in every respect. The scope of the present invention is defined by the claims not by the description above, and is intended to include any modification within the meaning and scope equivalent to the terms of the claims.

REFERENCE SIGNS LIST 1 hydraulic excavator; 2 lower traveling unit; 3 upper revolving unit; 4 work implement; 4a boom; 4b arm; 4c bucket; 5 counter weight; 6 cooling unit; 7 engine; 8 fan; 10 cab; 12 revolving frame; 13 center bracket; 15 upper plate; 16 upper lateral plate; 17 lower lateral plate; 18, 19 air vents; 20 rear wall; 21 upright wall part; 21s, 22s surface; 22 inclined wall part; 23, 23s, 68 connecting portion; 24 other edge; 60 oil cooler; 61 core part; 62 upper tank; 63, 65 connection port; 64 lower tank; 66 front surface; 67 inclined surface; 69, 79, 89 uppermost surface; 70 intercooler; 80 radiator; 95 baffle plate.

The invention claimed is:

1. A hydraulic excavator comprising:
a cab having a rear wall; and
a cooling device arranged on a rear side of said rear wall,
said rear wall having an upright wall part extending in the vertical direction and an inclined wall part connected to an upper edge of said upright wall part and inclined to a rear upper side with respect to the upper edge of said upright wall part,
an outer surface of said cooling device has a front surface facing said upright wall part and extending in the vertical direction, and an inclined surface having a lower edge directly connected to an upper edge of said front surface at the upper edge of said front surface, the inclined surface being inclined to the rear upper side with respect to the upper edge of said front surface,
said inclined wall part having one edge connected to said upright wall part and the other edge opposite to said one edge, the upper edge of said front surface being arranged below a height position of said other edge,
said upright wall part and said inclined wall part forming an angle more than or equal to an angle formed by said front surface and said inclined surface.

2. The hydraulic excavator according to claim 1, wherein the upper edge of said front surface is positioned between a bisector of the angle formed by said upright wall part and said inclined wall part and a height position of the upper edge of said upright wall part, in the vertical direction.

3. The hydraulic excavator according to claim 1, wherein said inclined surface has a portion extending in parallel to said inclined wall part.

4. The hydraulic excavator according to claim 1, further comprising:
a work implement; and
a hydraulic actuator driving said work implement, wherein said cooling device is an oil cooler cooling a hydraulic fluid supplied to said hydraulic actuator.

5. The hydraulic excavator according to claim 4, wherein said oil cooler includes a core part cooling the hydraulic fluid passing therethrough and an upper tank arranged over said core part,
said front surface and said inclined surface constitute an outer surface of said upper tank, and
a cross section of said upper tank perpendicular to a front-back direction has a rectangular outer shape.

6. The hydraulic excavator according to claim 1, further comprising a second cooling device arranged on the rear side of said cooling device, wherein
the uppermost surface of said second cooling device is arranged at a position higher than the uppermost surface of said cooling device.

7. The hydraulic excavator according claim 1, further comprising a sealing material provided between said rear wall and said outer surface of said cooling device.

8. The hydraulic excavator according to claim 2, wherein said inclined surface has a portion extending in parallel to said inclined wall part.

9. The hydraulic excavator according to claim 2, further comprising:
a work implement; and
a hydraulic actuator driving said work implement, wherein said cooling device is an oil cooler cooling a hydraulic fluid supplied to said hydraulic actuator.

10. The hydraulic excavator according to claim 9, wherein said oil cooler includes a core part cooling the hydraulic fluid passing therethrough and an upper tank arranged over said core part,
said front surface and said inclined surface constitute an outer surface of said upper tank, and
a cross section of said upper tank perpendicular to a front-back direction has a rectangular outer shape.

11. The hydraulic excavator according to claim 3, further comprising:
a work implement; and
a hydraulic actuator driving said work implement, wherein said cooling device is an oil cooler cooling a hydraulic fluid supplied to said hydraulic actuator.

12. The hydraulic excavator according to claim 11, wherein said oil cooler includes a core part cooling the hydraulic fluid passing therethrough and an upper tank arranged over said core part,
said front surface and said inclined surface constitute an outer surface of said upper tank, and
a cross section of said upper tank perpendicular to a front-back direction has a rectangular outer shape.

13. The hydraulic excavator according to claim 8, further comprising:
a work implement; and
a hydraulic actuator driving said work implement, wherein said cooling device is an oil cooler cooling a hydraulic fluid supplied to said hydraulic actuator.

14. The hydraulic excavator according to claim 13, wherein said oil cooler includes a core part cooling the hydraulic fluid passing therethrough and an upper tank arranged over said core part,
said front surface and said inclined surface constitute an outer surface of said upper tank, and
a cross section of said upper tank perpendicular to a front-back direction has a rectangular outer shape.

15. The hydraulic excavator according to claim 2, further comprising a second cooling device arranged on the rear side of said cooling device, wherein
the uppermost surface of said second cooling device is arranged at a position higher than the uppermost surface of said cooling device.

16. The hydraulic excavator according to claim 3, further comprising a second cooling device arranged on the rear side of said cooling device, wherein
the uppermost surface of said second cooling device is arranged at a position higher than the uppermost surface of said cooling device.

17. The hydraulic excavator according to claim 4, further comprising a second cooling device arranged on the rear side of said cooling device, wherein
the uppermost surface of said second cooling device is arranged at a position higher than the uppermost surface of said cooling device.

18. The hydraulic excavator according to claim 5, further comprising a second cooling device arranged on the rear side of said cooling device, wherein
the uppermost surface of said second cooling device is arranged at a position higher than the uppermost surface of said cooling device.

19. The hydraulic excavator according to claim 8, further comprising a second cooling device arranged on the rear side of said cooling device, wherein
the uppermost surface of said second cooling device is arranged at a position higher than the uppermost surface of said cooling device.

* * * * *